United States Patent Office 2,830,909
Patented Apr. 15, 1958

2,830,909

MEAT PACKAGING PROCESS

Robert F. Hagen, Chicago, and Richard D. Kornblum, Park Forest, Ill., assignors to Armour and Company, Chicago, Ill., a corporation of Illinois No Drawing. Application September 22, 1952
Serial No. 310,939

5 Claims. (Cl. 99—174)

This invention relates to the packaging of meat products, particularly to methods of packaging various types of meat at elevated temperatures such as are normally encountered in cooking, smoking, etc.

Heretofore, in packaging heat processed meat products, it has been the practice to place the finished meat product in a wrapper of cellulosic or cellophane material in order to preserve the meat and to prevent contamination. According to this practice, the meat is removed from the smoke house, oven, or other heating facility, and is allowed to cool or is chilled to room temperature or below. Subsequently the processed meat is placed in a suitable wrapper and is then stored or shipped at room temperature or under refrigeration.

The use of wrappers in this connection is intended to provide maximum retention of certain desirable qualities of the meat product such as uniform shape, color, flavor, texture, etc. Ordinarily in the distribution to the ultimate consumer it is required that the meat be held for a period of at least 10 days or more, and during this period of distribution it is found that despite the protection afforded by the meat wrapper there is considerable dehydration and loss of color, flavor, texture, etc. Therefore, at the present time it would be desirable to have methods of packaging heat processed meats which would avoid the foregoing disadvantages and which would provide the continued maintenance of the above-mentioned desired qualities.

It is an object of the present invention to provide a means of packaging heat processed meat products whereby the flavor, texture, color, etc. are retained during the period of distribution to the consumer. It is another object to provide a method of treating meat wherein the meat may be formed to a desired shape and maintained in such shape for extended periods of time. It is a further object to provide a method of packaging meat in a substantially sterile condition to eliminate the possibility of contamination of the meat. It is a still further object of the present invention to provide a heat processed meat product having superior color, flavor and texture. It is a still further object to provide a method of substantially eliminating shrink losses normally incident to the packaging of heat processed meats. These and other objects and advantages will be apparent as the specification proceeds.

The present invention is based on the discovery that texture deterioration, loss of flavor and aroma, shrink loss, etc. normally encountered in the cooking and smoking of meats, are substantially completely avoided when immediately following the heat treating step, prior to cooling and while the meat product is maintained at elevated temperature, the meat body is enclosed in a close-fitting vapor-impervious envelope. Another important feature of the present invention is that during the period when the sealed meat package is maintained at the desired elevated temperature, it may be readily manipulated and rolled to provide a uniformly cylindrical shape, advantage being taken of the fact that the meat in heated condition possesses plastic, moldable characteristics, whereas the envelope or wrapper possesses molding and constricting characteristics.

According to the present method the meat is subjected to a heating step such as cooking, smoking, etc. whereby the internal temperature of the meat body is raised to at least 90° F. Following heating, when the internal temperature falls within the range of about 80 to 125° F., and preferably about 90 to 120° F., the meat body is introduced, preferably with the aid of a stuffing horn or other suitable means, into an envelope or pouch, bag, tube, etc. made of flexible plastic film, preferably transparent. The envelope is then drawn firmly and pressed onto the meat body and the free open end is twisted (or folded) and sealed, whereby the air is excluded from the envelope and the meat body is provided with an external contacting protective film. While the meat body is enclosed in the envelope, and preferably after sealing, the meat body may be rolled, pressed, manipulated, etc. to form the same into the desired shape. The plastic character of the meat at the indicated temperatures facilitates shaping while at the same time the protective film remains relatively rigid thereby assisting in holding the meat in the desired shape and providing an attractive smooth surface. After the package is sealed and formed as desired, it is allowed to cool or is chilled to room temperature or below and is ready for distribution to the consumer. The meat product thus packaged may be handled according to the usual distribution procedures both at high temperature storage (80° F.) and at refrigeration storage (40° F.) for periods upward of 20 days and longer without surface dehydration, darkening, shrink loss, loss of color and flavor, etc. On the other hand, meat products of a comparable character packaged in accordance with methods heretofore known undergo considerable dehydration and loss of color, flavor, etc. when subjected to comparable conditions of distribution.

A further advantage of the present method is that the possibility of contamination, bacterial growth, etc. is minimized, since the meat is sealed prior to any substantial cooling and without the necessity for extended holding periods during which there ordinarily is opportunity for foreign material to come in contact with the meat body.

Various meat materials may be employed in the practice of the present invention. In general, any meat which is subjected to a heat treating process whereby the internal temperature of the meat body is brought to 90° F. or above, will be satisfactory. The present method is especially suitable in connection with the smoking of meats (where temperatures of 120° F. and higher are employed) but is not limited in this regard. Also, the present method is applicable to various forms of meat including ground and unground meats, especially sausage, hams, butts, and the like.

In the practice of the present invention, it is particularly important that the meat be sealed at a temperature of about 80 to 125° F. and preferably about 90 to 120° F. At temperatures below 80° F. it is found that the meat is not sufficiently plastic to afford the desired shaping, and also cooling below 80° F. results in the loss of considerable color, flavor, etc. At temperatures above 125° F. it is found that the plastic envelope material loses its desirable shaping properties and tends to become unmanageable.

The wrapping material contemplated by the present invention may be any suitable flexible, vapor-impervious film material, preferably transparent and capable of being thermo sealed. As examples of suitable materials may be mentioned polyvinylidene chloride, polyethylene, pure or modified unvulcanized rubber, rubber hydrochloride, and the like. Conveniently, the wrapping material is employed in the form of an envelope, bag, tube, or pouch (these forms being referred to herein as "envelope") having at least one opening for the introduction of the meat to be packaged. In the case of a tube, for example, the meat may be introduced into one of the open ends into a position intermediate the ends, and the open ends may then be twisted, folded, or crimped inwardly to cause stretching of the material in close contact over the meat surface and further to provide for sealing of the package. Sealing may be accomplished in any suitable manner as by tying, application of tapes, thermosetting, thermo sealing, etc.

Envelopes applicable to the present invention will in general be of substantially the same size and shape as the meat body to be packaged, although it is seen that this requirement is not critical, it being necessary only that the envelope be sufficiently large to permit insertion of the meat body. A close fit is preferred since it allows for exclusion of air without the need for resorting to folding or twisting of the envelope. In this connection, it may be stated that it is desirable to remove the air as completely as possible so as to avoid oxidation, vapor pockets, etc. A desirable feature of the present invention is that at the temperatures employed insertion of the meat body into the envelope is facilitated by virtue of the presence of an oily lubricative layer at the interface between the exterior surface of the meat body and the contacting surface of the envelope. Furthermore, at the temperatures indicated, envelopes of the type mentioned above are somewhat pliable and expansible with the result that the envelope may be stretched to accommodate irregularities in the shape of the meat body.

Shaping or forming of the meat may be accomplished in any suitable manner. Usually it will be satisfactory to roll the meat body between parallel surfaces to impart a cylindrical shape, and it will also be satisfactory merely to knead the meat body by hand as desired. It is found that at the desired temperatures (80 to 125° F.) the meat body possesses plastic characteristics whereas the envelope or wrapping, although responsive to forming pressures, is sufficiently stiff and inelastic so that when the meat body is distorted or deformed into the desired shape, the envelope resists any tendency of the meat body to return to its original shape, thereby facilitating the forming operation. Once the desired shape has been obtained, the package may be chilled or allowed to cool to room temperature or below. Advantageously, at these lower temperatures the meat body sets up or congeals into a firm mass which cannot be deformed by the pressures, stresses, etc. ordinarily encountered in distribution.

For the better understanding of the present invention, a preferred embodiment thereof illustrating the packaging of smoked butts may be set forth as follows:

Butts averaging 1½ to 3 pounds are subjected to smoking (120 to 145° F.) in a smoke-house according to well-known procedure. Following smoking, the butts are taken directly from the smoke-house and with the internal temperature at 120° F. are stuffed into Visten (polyvinyl plastic) bags. The open ends of the bags are firmly drawn shut to exclude air from the bags and are thermo-sealed at 200 to 400° F. The sealed-in butts are rolled to eliminate surface irregularities and then allowed to cool to room temperature.

Meat packaged in accordance with the present method is found to maintain the desired flavor, texture, color, etc., throughout the period required for distribution whereas meat packaged on a comparable basis in accordance with prior methods are markedly inferior following such period, there being objectionable dehydration and darkening of the surface areas as well as substantially complete loss of odor. At the end of the distribution period, the shrink loss of butts packaged in accordance with the present invention is negligible whereas the shrink loss of conventionally packaged butts for the same period is 7% or more.

While in the foregoing specification we have set forth certain embodiments in considerable detail for the purpose of illustration, it will be understood that such detail may be varied widely by those skilled in the art without departing from the spirit of our invention.

We claim:

1. In a process for preparing a smoked meat package the steps of smoking a meat body at a temperature greater than 90° F., applying external pressure to the smoked meat body while enclosed in an unsealed vapor-impervious film to mold said smoked meat body and to expel air from the inside of said film, and sealing said film, both the application of external pressure and the sealing of the film being accomplished while the internal temperature of said smoked meat body is within the range of about 80 to 125° F.

2. A process of packaging smoked meat which comprises smoking a meat body at smoking temperatures greater than 90° F., allowing the temperature of said smoked meat body to drop to a point within the range of about 80 to 125° F., enclosing said smoked meat body in a flexible vapor-impervious unsealed envelope, applying external pressure to said enclosed meat body to mold said meat body and to expel the enclosed air from inside said unsealed envelope, and sealing said envelope encasing said smoked meat body, all of said steps recited above which are subsequent to the initial smoking step being performed while the internal temperature of said smoked meat body is within the range of about 80 to 125° F.

3. In a process for preparing a meat package the step of applying external pressure to a meat body which is enclosed in an unsealed vapor-impervious film to mold said meat body and to expel air from the inside of said film, and sealing said film, both the application of external pressure and the sealing of the film being accomplished while the internal temperature of said meat body is within the range of about 80 to 125° F.

4. In a process for preparing a meat package the step of applying external pressure to a meat body having a temperature greater than about 80° F. and less than about 125° F. which is enclosed in an unsealed vapor-impervious film to mold said meat body and to expel air from the inside of said film.

5. A process of packaging meat comprising enclosing a meat body having an internal temperature within the range of about 80 to 125° F. in a flexible vapor-impervious unsealed envelope, applying external pressure to said enclosed meat body to expel air from the inside of said film enclosing said meat body and to mold said meat body into a desirable shape, and sealing said envelope prior to the lowering of the temperature of the enclosed meat body below about 80° F.

References Cited in the file of this patent

UNITED STATES PATENTS

| | | |
|---|---|---|
| 1,678,632 | Briggs | July 31, 1928 |
| 2,366,169 | Barth | Jan. 2, 1945 |
| 2,369,765 | Waters | Feb. 20, 1945 |
| 2,506,908 | Thompson | May 9, 1950 |
| 2,528,832 | Johnson | Nov. 7, 1950 |

OTHER REFERENCES

"Modern Packaging," September 1950, pages 93, 94, 95, 199, and 201.